(12) United States Patent
Churaev et al.

(10) Patent No.: US 11,380,303 B2
(45) Date of Patent: Jul. 5, 2022

(54) SYSTEM AND METHOD FOR CALL CLASSIFICATION

(71) Applicant: AO Kaspersky Lab, Moscow (RU)

(72) Inventors: Nikolay A. Churaev, Moscow (RU); Andrey I. Golubev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 17/155,339

(22) Filed: Jan. 22, 2021

(65) Prior Publication Data
US 2021/0264897 A1 Aug. 26, 2021

(30) Foreign Application Priority Data
Feb. 26, 2020 (RU) .............................. 2020108161

(51) Int. Cl.
| G10L 15/00 | (2013.01) |
| G10L 15/02 | (2006.01) |
| H04M 3/51 | (2006.01) |
| H04M 3/42 | (2006.01) |
| G10L 15/197 | (2013.01) |
| H04M 3/22 | (2006.01) |

(52) U.S. Cl.
CPC ............ *G10L 15/02* (2013.01); *G10L 15/197* (2013.01); *H04M 3/2281* (2013.01); *H04M 3/42221* (2013.01); *H04M 3/5175* (2013.01); G10L 2015/025 (2013.01); H04M 2201/40 (2013.01)

(58) Field of Classification Search
CPC . G10L 15/02; G10L 15/197; G10L 2015/025; G10L 15/22; H04M 3/5175; H04M 3/42221; H04M 3/2281; H04M 2201/04; H04M 2201/40
USPC ........................................................ 704/251
See application file for complete search history.

(56) References Cited

U.S. PATENT DOCUMENTS

| 2005/0221840 | A1 | 10/2005 | Yamamoto et al. |
| 2009/0006085 | A1 | 1/2009 | Horvitz et al. |
| 2010/0157853 | A1 | 6/2010 | Li et al. |
| 2017/0134575 | A1 | 5/2017 | Quilici et al. |
| 2018/0122377 | A1* | 5/2018 | Skantze ................. G10L 15/22 |
| 2018/0240028 | A1 | 8/2018 | Baracaldo et al. |
| 2019/0158666 | A1* | 5/2019 | St-Cyr ................. H04M 3/5175 |

FOREIGN PATENT DOCUMENTS

CN 107331385 A 11/2017

* cited by examiner

*Primary Examiner* — Md S Elahee
(74) *Attorney, Agent, or Firm* — ArentFox Schiff LLP; Michael Fainberg

(57) ABSTRACT

A method for voice call analysis and classification includes intercepting a voice call session between an initiating device and a recipient device. Voice call data exchanged between the initiating device and the recipient device during the voice call session is transformed into a predefined data format. The transformed voice call data is analyzed to determine one or more attributes of the intercepted voice call. One or more features associated with the intercepted voice call session are identified based on the determined one or more attributes. The intercepted voice call is classified using the identified one or more features.

12 Claims, 5 Drawing Sheets

SYSTEM AND METHOD FOR CALL CLASSIFICATION

CROSS-REFERENCE TO RELATED APPLICATION

This application claims benefit of priority under 35 U.S.C. 119(a)-(d) to a Russian Application No. 2020108161 filed on Feb. 26, 2020, which is incorporated by reference herein.

FIELD OF TECHNOLOGY

The invention relates to the field of information security, and, more specifically, to system and method for voice call classification.

BACKGROUND

At present, practically every owner of a universal mobile device (such as a mobile telephone, a smartphone, a tablet, and so forth) is dealing with unwanted calls from banks, medical centers, insurance offices, beauty salons, and other companies using telemarketing in their work. In the United States, legislation is in effect that legally prohibits certain telemarketer calls without the consent of the user. However, the majority of companies implicitly stipulate such a clause in their contracts and get around the legislation.

In some cases, the companies providing telephone marketing services make active use of intelligent bots (robots), which in the process of communication may imitate people. The robots determine the level of irritability or interest of a person and often tailor the conversation in such a manner as to avoid a marketing tone. Intelligent bots are also often used by hackers to obtain confidential information of the user (such as data related to credit cards, social security numbers, and so forth).

Currently there are mobile applications which determine telephone numbers (such as TrueCaller) that are used to deal with such nuisance calls. In the majority of cases, incoming calls are checked against a database of spam numbers, which is constantly updated, and if the number of a calling spammer or hacker is present in this database the user is notified that the calling party has been detected in intrusive communication.

However, at present, it is possible to make a telephone call anonymous or to mask a telephone number with the aid of number swapping technology. Increasingly often, hackers and other malicious entities use this technology to call bank customers from the numbers of credit organizations and request the information needed to make withdrawals.

Conventional systems are well equipped to deal well with the problem of identifying robotized calls, but typically are not able to classify a call from various malicious entities. Moreover, in new hacking schemes the changing of the number discredits the legal subscriber instead of the hacker. The blocking of such numbers, for example, may result in banks losing the ability to get through to their customers.

Thus, there is a need to solve the problem of call classification, including hacking calls with swapped numbers.

SUMMARY

Disclosed are systems and methods for classifying voice calls by analysis of the recording and certain attributes of the voice call, and providing the user with information on a particular class of call by means of call classification.

In one aspect, a method is proposed for voice call analysis and classification, wherein the method involves steps in which: a voice call session between an initiating device and a recipient device is intercepted. Voice call data exchanged between the initiating device and the recipient device during the voice call session is transformed into a predefined data format. The transformed voice call data is analyzed to determine one or more attributes of the intercepted voice call. One or more features associated with the intercepted voice call session are identified based on the determined one or more attributes. The intercepted voice call is classified using the identified one or more features.

In one aspect, transforming the voice call data further includes recording the voice call data. In one aspect, the predefined data format includes formatted text.

In one aspect, classification type of the intercepted voice call includes at least one of: a regular call and unwanted call. In one aspect, the one or more identified features includes at least one of: a call category, emotional component of the voice call data, presence of robotized speech and call duration.

In one aspect, the call category includes at least one of: telemarketing, social survey, offer of services, fraud.

In one aspect, the call category is determined using one or more call categorization attributes based on the recording. In one aspect, the call categorization attributes include at least one of: words, n-grams, word-embedding, bag-of-words.

In one aspect, the emotional component of the intercepted voice call is positive or negative based on at least one of: (i) rules in which text is broken up into words or sequences of words having a previously assigned positive or negative evaluation, (ii) glossaries in which the number of positive and negative words from a previously compiled glossary are counted, (iii) machine learning.

In one aspect, the presence of the robotized speech is determined using a set of previously selected strings of phonemes.

In one aspect, classifying the intercepted voice call further includes using a trained classification model based on a set of previously selected voice calls having features.

In one aspect, the trained classification model is based on at least one of: naive Bayesian classifier, logistic regression, MRF (Markov Random Field) classifier, SVM (support vector machine), k-nearest neighbor, and/or decision tree.

In one aspect, the method further includes sending a notification to the recipient device. In one aspect, the notification indicates a classification category of the intercepted voice call.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for voice call classification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
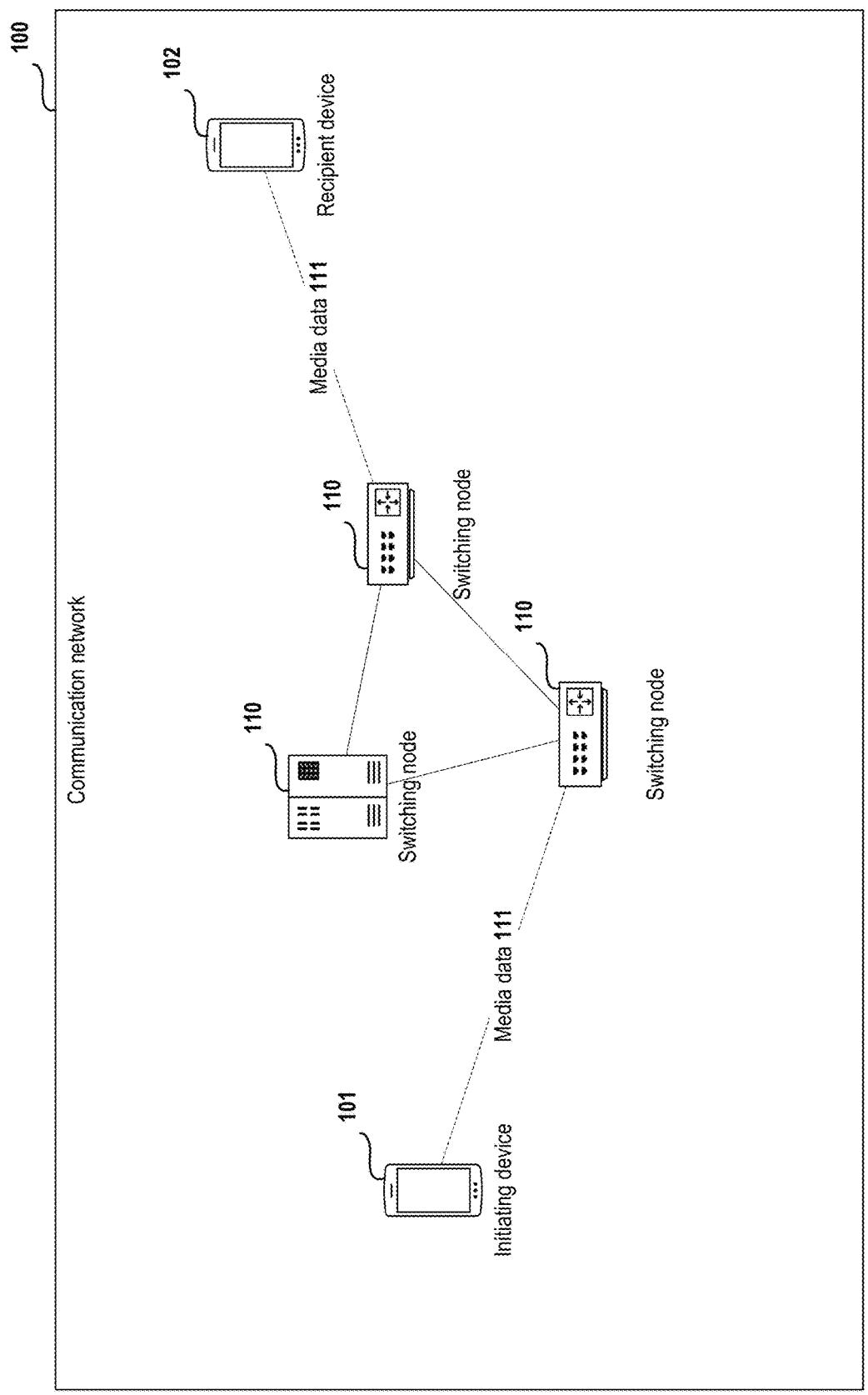
FIG. 1 shows a block diagram of a communication network, in accordance with aspects of the present disclosure.

FIG. 1 shows a block diagram of a communication network. The communication network 100 may include an initiating device 101, a recipient device 102, a switching node 110, and media data 111. The communication network 100 provides multiple physical communication channels and at least one switching node 110. The switching node 110 provides services for transmission of media data 111 (such as voice call data) between the initiating device 101 and the recipient device 102. Examples of communication networks 100 may include, but are not limited to: a computer network; a telephone network, and/or a cellular communication network.

The term "device" (such as initiating device and recipient device) refers to equipment which transforms user information into media data 111 (such as voice call data) for transmission by communication channels and which performs the back transformation.

The term "call-up" refers to an attempt to establish a connection with the recipient device 102, initiated by the initiating device 101.

The term "call" refers to the process of transmitting media data 111 between the initiating device 101 and the recipient device 102 within an established voice call session.

The media data 111 may comprise: a media file; and/or streaming data (media data sent in streaming mode).

For example, the initiating device 101 and the recipient device 102 may be mobile telephones of subscribers of a cellular communication network, where the term "call" refers to an ordinary voice call.

Figure 2:
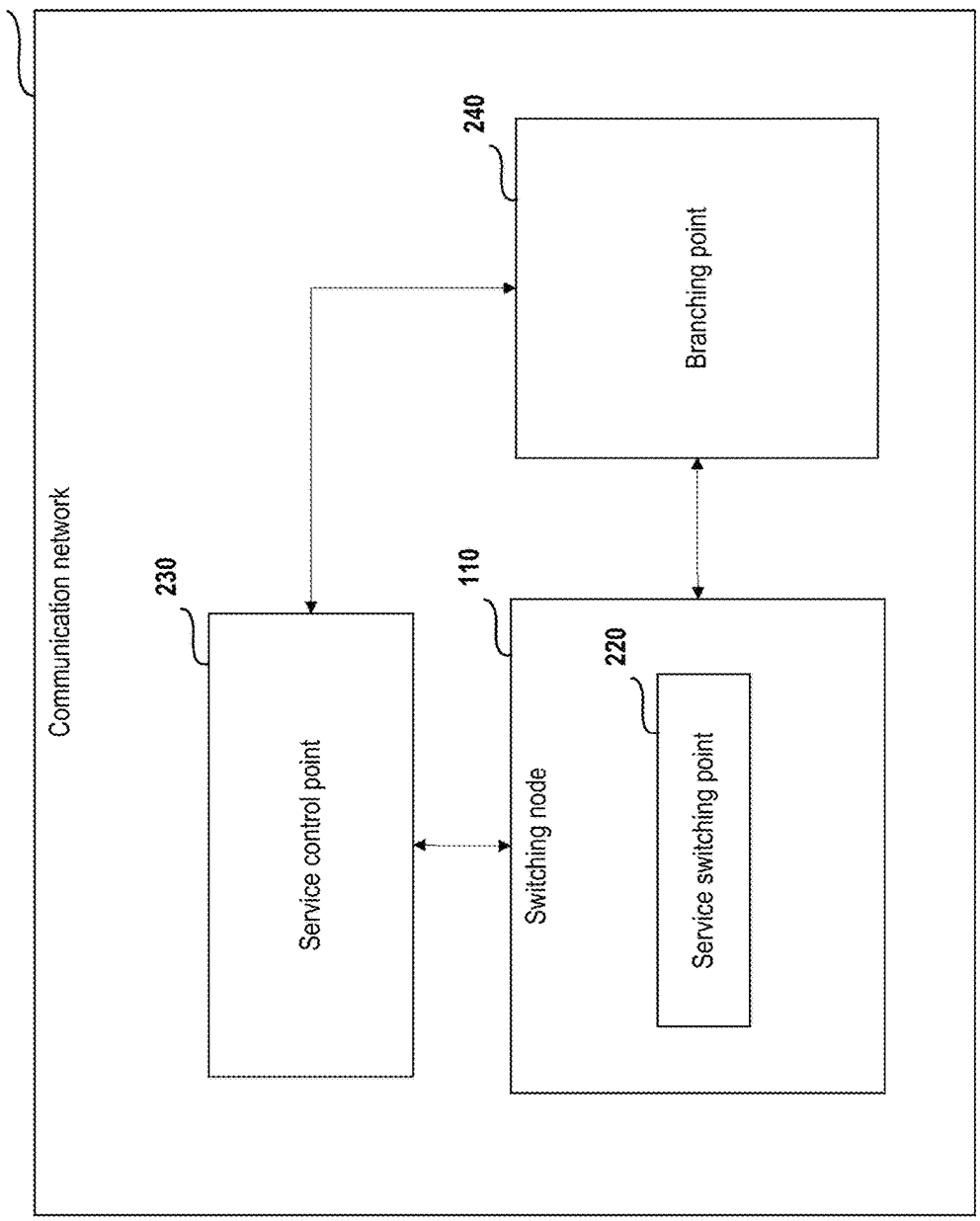
FIG. 2 shows a block diagram of an intelligent communication network, in accordance with aspects of the present disclosure.

FIG. 2 shows a block diagram of an intelligent network, in accordance with aspects of the present disclosure. An example of an intelligent communication network 200 may include a switching node 110, a service switching point 220, a service control point 230, and a branching point 240. The intelligent network 200, by modernizing at least one switching node 110 of the communication network 100, may facilitate additional communication services. It should be noted that the architecture of the intelligent network 200 is independent of the type of switching network 100.

In this example, the switching node 110 retains the functions for providing the basic services, but it may also be equipped with a service switching point 220. The service switching point 220 may be configured to provide for the initiatalizion of various call handling algorithms, may carry out instructions arriving from the service control point 230, and may monitor the process of call handling of the intelligent network 200.

The service control point 230 may facilitate services in the entire intelligent network 200, providing protocols for interaction between its elements.

In one variant aspect, the intelligent network 200 may contain a branching point 240 that may be configured to provide for the transmission of a copy of the media data 111 to other auxiliary elements of the intelligent network 200 (for example, a speech recognition device), making the services of the intelligent network 200 more convenient to the user.

The services provided by intelligent network 200 may include but are not limited to: a toll-free call service, providing directory information free of charge; televoting, providing voting capabilities by calling up a particular number; and/or providing communications by prepaid cards.

Figure 3:
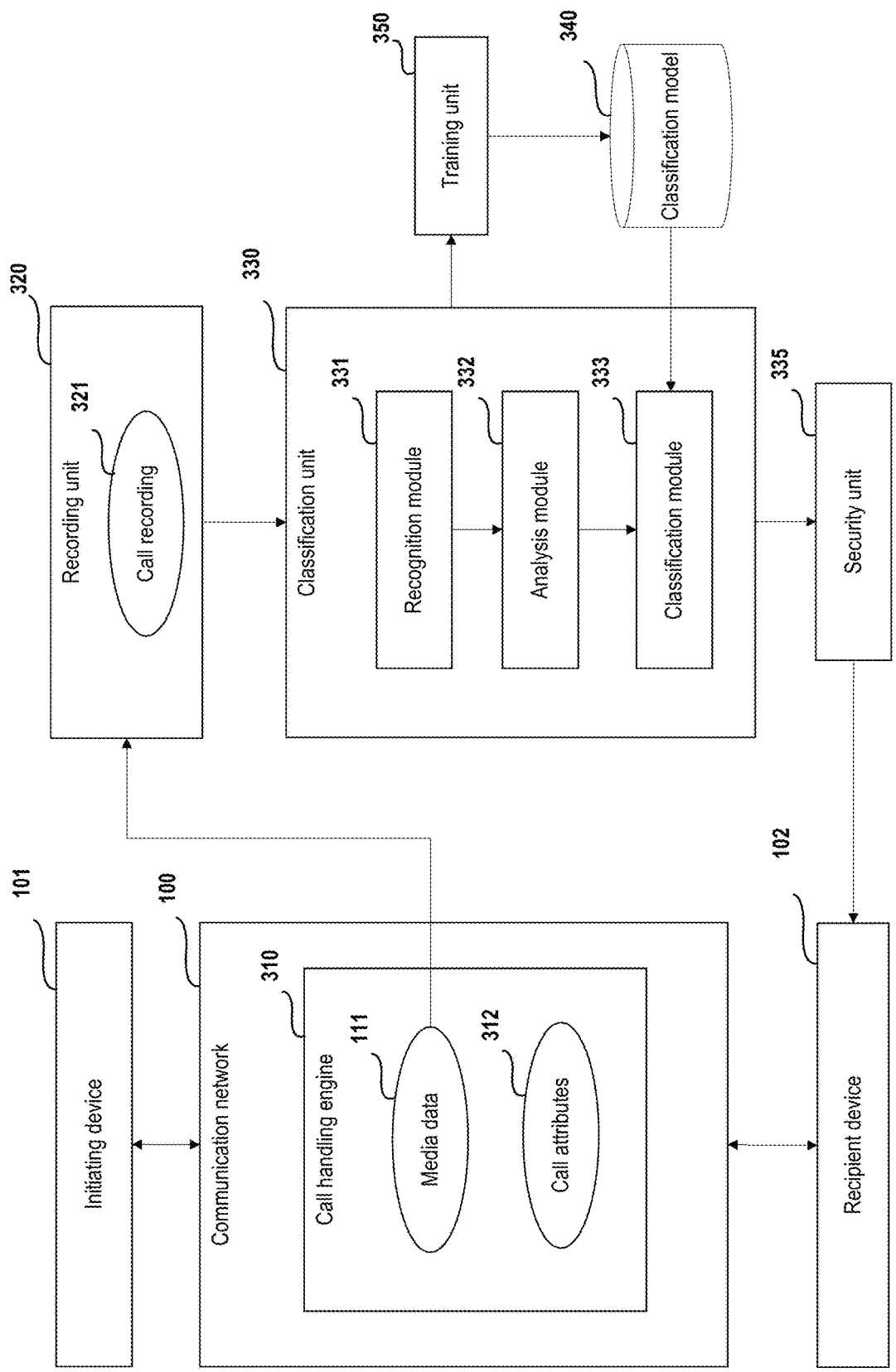
FIG. 3 illustrates a call classification system, in accordance with aspects of the present disclosure.

FIG. 3 illustrates a call classification system, in accordance with aspects of the present disclosure. The call classification system 300 may include a communication network 100, an initiating device 101, a recipient device 102, a call handling engine 310, media data 111 (such as voice call data), call attributes 312, a recording unit 320, a call recording 321, a classification unit 330, a recognition module 331, an analysis module 332, a classification module 333, a security unit 335, a classification model 340, and a training unit 350.

The call handling engine 310 may be configured to intercept a voice call from the initiating device 101 to the recipient device 102 in the communication network 100, to determine the characteristics of the call 312. The call handling engine 310 may be further configured to send the media data 111 to the recording unit 320. The characteristics of the call determined at this stage may include, but are not limited to: identifier of the initiating device 101, identifier of the recipient device 102, a timestamp indicating time of the intercepted call, status of the recipient device 102.

In one aspect, the communication network 100 may comprise an intelligent network 200 (shown in FIG. 2), utilizing resources of public telephone networks.

For example, the initiating device 101 may initiate a voice call. After receiving the voice call, the service switching point 220 of the switching node 110 may determine that the connection requires switching with the service control point 230. The switching node 110 may establish the corresponding voice call session and may send a signal containing the characteristics of the call 312.

The call handling engine 310 may be configured to intercept the characteristics of the call 312 and to notify the switching node 110 as to the need for routing the intercepted voice call through the branching point 240. The branching point 240 may establish a connection using two different channels: a first channel to the recipient device 102 and a second channel to the recording unit 320.

After the connection has been established, the voice call data 111 from each of the respective devices are sent through the branching point 240, where the data may be duplicated. In other words, one data stream may be directed to the receiving party, another data stream may be directed to the recording unit 320. Such duplication may continue until the voice call is completed.

In one aspect, the switching node 110 may not be able to establish a connection with the recipient device 102, at least because: the recipient device 102 responds with a "busy" signal; the recipient device 102 is unavailable; an error has occurred in establishing the connection; and/or the recipient device 102 responds with a refusal to receive the connection.

In these scenarios, the call handling engine 310 may send a signal to the switching node 110 indicating the need to route the intercepted voice call to the recording unit 320.

The recording unit 320 may be configured to record the media data 111 being sent within an established voice call session during a call and to direct the produced recording of the call 321 to the classification unit 330. The recording of the call 321 may comprise a media file, for example.

In one aspect, the recording unit 320 may produce a recording of the voice call data 111 in a plurality of fragments. The recording unit 320 may send a fragment recording of the voice call 321 to the classification unit 330 prior to the actual completion of the call, thusly making it possible to determine its classification in advance.

As shown in FIG. 3, the classification unit 330 may include a recognition module 331, an analysis module 332, and a classification module 333.

The recognition module 331 may be configured to transform the recording of the call 321 received from the recording unit 320 into a predefined format suitable for analysis, such as formatted text.

In one aspect, the recognition module 331 may divide up the media file into a plurality of fragments. Each fragment of the media file may be subjected to a number of transformations, as a result of which coefficients are obtained which describe frequency characteristics of the corresponding fragment. On the basis of this data, the recognition module 331 may determine with a certain probability which phoneme the corresponding fragment belongs to.

The recognition module 331 may also be additionally trained using a set of previously selected texts to recognize strings of probable phonemes. If necessary, the recognition module 331 may reconstruct unrecognized words by meaning, based on the context and available statistics. The data obtained in the course of the recognition of phonemes and the recognition of strings of phonemes may be combined and the recognition module 331 may determine the most likely sequence of words.

For example, for two equally probable phonemes "m" and "t" in the word "make", the recognition module 331 will conclude that it is more likely that the phoneme "m" is used in the word, since during its training it often encountered the sequence "make money", and more seldom "take money".

In one variant aspect, in the concluding phase, the recognition module 331 may transform numerals into numbers and certain punctuation marks (such as hyphens) may be put in place. This transformed text is the final result of the recognition, which may be sent to the analysis module 332 by the recognition module 331.

In an aspect, the recognition module 331 may be further trained using a set of previously selected strings of phonemes to recognize robotized speech in a call recording 321.

In an aspect, the recognition module 331 may identify the features of the call 312.

The identified call features may include, but are not limited to: a call category, emotional component of the voice call data, presence of robotized speech and call duration.

The analysis module 332 may be configured to pronounce a verdict as to whether a call recording 321 pertains to at least one of the categories based on an analysis of the content of the call recording 321 processed by the recognition module 331.

The categories of the call recording 321 may include, but are not limited to: fraud; spam; offer of services; and/or regular call.

In an aspect, the analysis module 332 may transform the call recording 321 processed by the recognition module 331 into a set of attributes suitable for categorization. The attributes may include, but are not limited to: words; a sequence of words (n-grams); a vectorial representation of words (word embedding); and/or a multiset of words not counting grammar or order (bag-of-words).

Next, using a machine learning algorithm, the analysis module 332 may determine a type of the call recording 321 processed by the recognition module 331. The machine learning classification algorithm may include, but is not limited to: Bayesian classifiers (naive Bayesian classifier); logistic regression; MRF classifier; the method of support vectors (SVM, support vector machine); nearest neighbor methods (k-nearest neighbor); and/or decision tree.

For example, the machine learning algorithm utilized by the analysis module 332 may be trained with a large number of fraudulent call recordings, where hackers under a variety of pretexts (checking data, financial transactions) ask for certain personal data, such as bank account numbers or passwords. Each fraudulent call recording may be represented as a set of attributes. As a non-limiting example, the phrase "send password from SMS", present in the call recording 321 processed by the recognition module 331 in the form of one of the attributes, may allow the analysis module 332 to assign the call recording 321 processed by the recognition module 331 to the classification type of "fraud".

In one aspect, the analysis module 332 may utilize the plurality of attributes to make an emotional assessment of the call recording 321. Such analysis enables the analysis module 332 to determine whether the emotional content of the intercepted voice call was one of the following: positive; negative; and/or neutral.

The analysis module 332 may be configured to determine the emotional content of the intercepted voice call using one of the following methods:
- based on rules, in which text is broken up into words or sequences of words having a previously assigned positive or negative evaluation;
- based on glossaries, in which the number of positive and negative words from a previously compiled glossary are counted; such glossaries may include the particles "not" or "non";
- based on machine learning; and/or
- based on a hybrid method involving the use of some or all of the classifiers in a particular sequence.

The classification module 333 may be configured to provide a verdict as to whether the call belongs to at least one of the types of voice calls by using a trained classification model 340. The classification categories of voice calls may include, but are not limited to: unwanted call and/or regular call.

In one aspect, the characteristics of a call pertaining to an already known class of voice calls may be first collected. On the basis of the collected training data, the classification model 340 may be trained so that voice calls having similar characteristics can be classified by that classification model 340 with an improved accuracy.

The classification model 340 may be trained using at least the following training data: the category of the call recording (such as telemarketing, social survey, offer of services, fraud and the like); the emotional components of the voice call data (positive, negative, neutral); presence of the robotized speech in the call recording and/or the duration of the call.

For example, if the analysis module 332 has classified a call recording 321 of the intercepted voice call as offering services and has determined the emotional content of the call as being negative, the classification module 333 may classify the intercepted voice call as unwanted, and pertaining to spam.

The classification algorithm employed by the classification module 333 may include at least one of the following:
Bayesian classifiers (naive Bayesian classifier);
logistic regression;

MRF classifier;
the method of support vectors (SVM, support vector machine);
nearest neighbor methods (k-nearest neighbor); and/or decision tree.

The security unit 335 may be configured to inform the user of the recipient device 102 as to a certain class of the voice call via a notification message. The notification message may include, but is not limited to: an SMS message; a local notification (push notification); and/or a pop-up window.

In one aspect, the notification message sent to the recipient device 102 may include the recording 321 of the voice call data processed by the recognition module 331.

For example, if during the call-up the switching node 110 was unable to establish a connection with the recipient device 102, the classification unit 330 may determine the class of the voice call based on the recording of media data (such as voice call data) 111 sent by the initiating device 101. The security unit 335 may be configured to inform the user of the recipient device 102 as to the determined class of the missed voice call with a local notification, for example.

In an aspect, the security unit 335 may send a command to the switching node 110 in advance to terminate a call-up if the type of the call has been determined at least as fraud.

The training unit 350 may be configured to train the classification model 340 on the basis of new training data.

For example, if the decision of the classification model 340 has proved to be wrong, the user of the recipient device 102 may redefine the type of the corresponding voice call. In other words, the training unit 350 may train the classification model 340, based on the feedback of the user of the recipient device 102, so that the probability of a correct determination of the call class is heightened during further use of the classification model 340.

Figure 4:
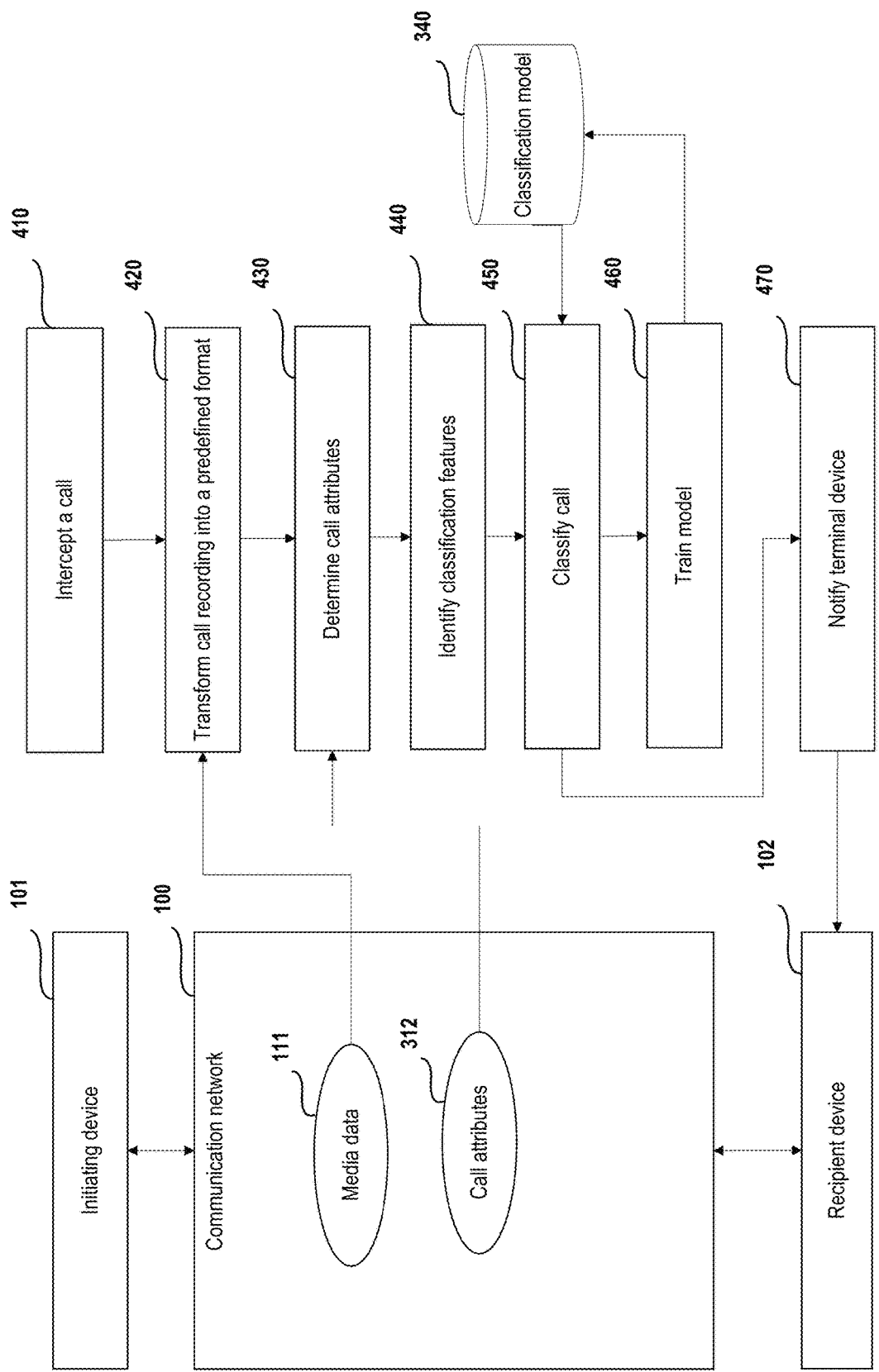
FIG. 4 illustrates a method for analyzing and classifying a voice call, in accordance with aspects of the present disclosure.

FIG. 4 illustrates a method for analyzing and classifying a voice call, in accordance with aspects of the present disclosure.

At step 410, the call handling engine 310 may intercept a voice call from the initiating device 101 to the recipient device 102 in the communication network 100.

At step 420, the recognition module 331 may transform the recording of the call 321 received from the recording unit 320 into a predefined format suitable for analysis, such as formatted text.

At step 430, the call handling engine 310 may be used to determine the attributes of the intercepted voice call 312. In one aspect, the call categorization attributes may include at least one of: words, n-grams, word-embedding, bag-of-words.

At step 440, the analysis module 332 may transform the call recording 321 processed by the recognition module 331 into a set of features suitable for classification. As noted above, the features may include, but are not limited to: a call category, emotional component of the voice call data, presence of robotized speech and call duration.

At step 450, the classification module 333 may be configured to provide a verdict as to whether the call belongs to at least one of the classification categories of voice calls by using a trained classification model 340.

The classification categories of voice calls may include, but are not limited to: fraud; spam; telemarketing; unwanted call; and/or regular call.

In addition, in an aspect, at step 460 the training unit 350 may be used to train the classification model 340 so that the accuracy of the classification is increased in the next iteration.

In addition, in an aspect, at step 470 the security unit 335 may be used to provide the user of the recipient device 102 with information about the call class which has been determined.

Figure 5:
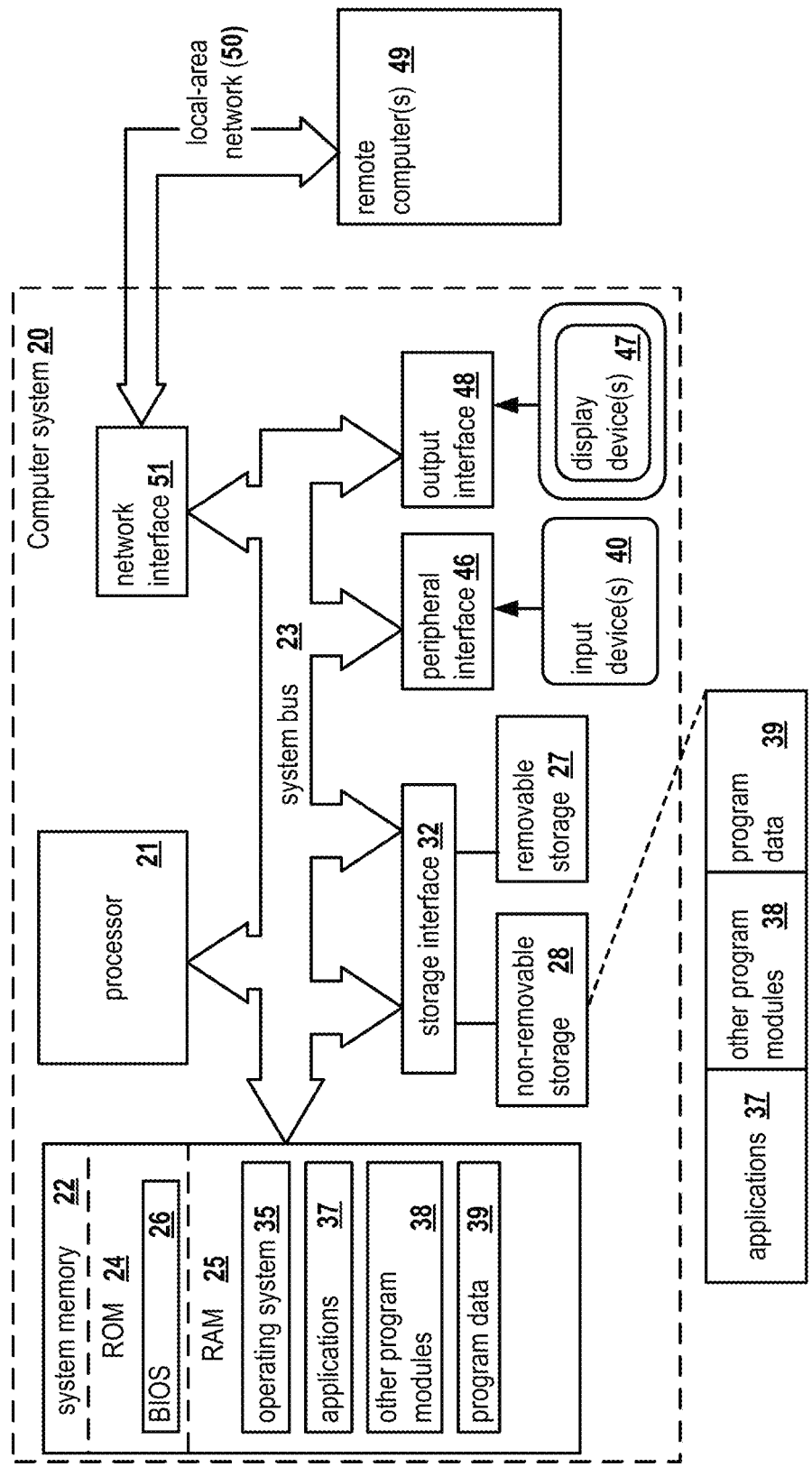
FIG. 5 shows an example of a general-purpose computer system.

FIG. 5 is a block diagram illustrating a computer system 20 on which aspects of systems and methods for call classification may be implemented in accordance with an exemplary aspect. The computer system 20 may represent a call classification system of FIG. 3 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for analyzing and classifying a voice call, the method comprising:
   intercepting a voice call session between an initiating device and a recipient device;
   transforming voice call data exchanged between the initiating device and the recipient device during the voice call session into a predefined data format, wherein transforming the voice call data further comprises recording the voice call data and wherein the predefined data format comprises formatted text;
   analyzing the transformed voice call data to determine one or more attributes of the intercepted voice call;
   identifying one or more features associated with the intercepted voice call session based on the determined one or more attributes; and
   classifying the intercepted voice call using the one or more identified features, wherein classification type of the intercepted voice call includes at least one of: a regular call and unwanted call and wherein the one or more identified features include at least one of (i) presence of robotized speech and (ii) emotional component of the intercepted voice call, wherein the presence of the robotized speech is determined using a set of previously selected strings of phonemes and wherein the emotional component of the intercepted voice call is positive or negative based on at least one of: (i) rules in which text is broken up into words or sequences of words having a previously assigned positive or negative evaluation, (ii) glossaries in which the number of positive and negative words from a previously compiled glossary are counted, (iii) machine learning.

2. The method of claim 1, wherein the call category includes at least one of: telemarketing, social survey, offer of services, fraud.

3. The method of claim 2, wherein the call category is determined using one or more call categorization attributes based on the recording, and wherein the call categorization attributes include at least one of: words, n-grams, word-embedding, bag-of-words.

4. The method of claim 1, wherein classifying the intercepted voice call further comprises using a trained classification model based on a set of previously selected voice calls having features.

5. The method of claim 4, wherein the trained classification model is based on at least one of: naive Bayesian classifier, logistic regression, MRF (Markov Random Field) classifier, SVM (support vector machine), k-nearest neighbor, and/or decision tree.

6. The method of claim 1, further comprising sending a notification to the recipient device, wherein the notification indicates a classification category of the intercepted voice call.

7. A system for analyzing and classifying a voice call, the system comprising:
   a hardware processor configured to:
   intercept a voice call session between an initiating device and a recipient device;
   transform voice call data exchanged between the initiating device and the recipient device during the voice call session into a predefined data format, wherein the hardware processor configured to transform the voice call data is further configured to record the voice call data and wherein the predefined data format comprises formatted text;
   analyze the transformed voice call data to determine one or more attributes of the intercepted voice call;
   identify one or more features associated with the intercepted voice call session based on the determined one or more attributes; and
   classify the intercepted voice call using the one or more identified features, wherein classification type of the intercepted voice call includes at least one of: a regular call and unwanted call and wherein the one or more identified features include at least one of (i) presence of robotized speech and (ii) emotional component of the intercepted voice call, wherein the presence of the robotized speech is determined using a set of previously selected strings of phonemes and wherein the emotional component of the intercepted voice call is positive or negative based on at least one of: (i) rules in which text is broken up into words or sequences of words having a previously assigned positive or negative evaluation, (ii) glossaries in which the number of positive and negative words from a previously compiled glossary are counted, (iii) machine learning.

8. The system of claim 7, wherein the call category includes at least one of: telemarketing, social survey, offer of services, fraud.

9. The system of claim 8, wherein the call category is determined using one or more call categorization attributes based on the recording, and wherein the call categorization attributes include at least one of: words, n-grams, word-embedding, bag-of-words.

10. The system of claim 7, wherein the hardware processor configured to classify the intercepted voice call is further configured to use a trained classification model based on a set of previously selected voice calls having features.

11. The system of claim 10, wherein the trained classification model is based on at least one of: naive Bayesian classifier, logistic regression, MRF (Markov Random Field) classifier, SVM (support vector machine), k-nearest neighbor, and/or decision tree.

12. A non-transitory computer readable medium storing thereon computer executable instructions for analyzing and classifying a voice call, including instructions for:
   intercepting a voice call session between an initiating device and a recipient device;
   transforming voice call data exchanged between the initiating device and the recipient device during the voice call session into a predefined data format, wherein transforming the voice call data further comprises recording the voice call data and wherein the predefined data format comprises formatted text;
   analyzing the transformed voice call data to determine one or more attributes of the intercepted voice call;
   identifying one or more features associated with the intercepted voice call session based on the determined one or more attributes; and
   classifying the intercepted voice call using the one or more identified features, wherein classification type of the intercepted voice call includes at least one of: a regular call and unwanted call and wherein the one or more identified features include at least one of (i) presence of robotized speech and (ii) emotional component of the intercepted voice call, wherein the presence of the robotized speech is determined using a set of previously selected strings of phonemes and wherein the emotional component of the intercepted voice call is positive or negative based on at least one of: (i) rules in which text is broken up into words or sequences of words having a previously assigned positive or negative evaluation, (ii) glossaries in which the number of positive and negative words from a previously compiled glossary are counted, (iii) machine learning.

* * * * *